United States Patent [19]

Goto et al.

[11] Patent Number: 4,620,959

[45] Date of Patent: Nov. 4, 1986

[54] METHOD OF RELEASING AN INNER MOLD FROM A RUBBERY ELASTIC MOLDING

[75] Inventors: Daisaku Goto, Konan; Hikoharu Sugimoto, Kasugai; Nobuyuki Kato, Iwakura, all of Japan

[73] Assignee: NGK Insulators, Ltd., Japan

[21] Appl. No.: 807,213

[22] Filed: Dec. 12, 1985

Related U.S. Application Data

[63] Continuation of Ser. No. 579,505, Feb. 13, 1984, abandoned.

[30] Foreign Application Priority Data

Feb. 25, 1983 [JP] Japan .................................. 58-29278

[51] Int. Cl.$^4$ ............................................. B29C 41/42
[52] U.S. Cl. ..................................... 264/335; 249/63; 249/66 C; 264/318; 425/437
[58] Field of Search ................... 264/318, 328.1, 328.3, 264/335, 537; 425/553, 554, 556, 577, 450.1, 451.7, 468, DIG. 58, 437; 249/63, 66 A, 66 C, 67

[56] References Cited

U.S. PATENT DOCUMENTS

| | | | |
|---|---|---|---|
| 2,361,026 | 10/1944 | Greene | 425/437 X |
| 4,364,895 | 12/1982 | Underwood | 264/335 |
| 4,375,948 | 3/1983 | Von Holdt | 425/437 |

FOREIGN PATENT DOCUMENTS

| | | |
|---|---|---|
| 2832177 | 1/1980 | Fed. Rep. of Germany . |
| 1572926 | 8/1980 | United Kingdom . |
| 2042409 | 9/1980 | United Kingdom . |

*Primary Examiner*—Jan Silbaugh
*Attorney, Agent, or Firm*—Parkhurst & Oliff

[57] ABSTRACT

A method of releasing an inner mold from a rubbery elastic molding having a corrugation in its inner longitudinal cavity and adapted suitably for, but not limited to, use in an electrical bushing or electrical insulator, which method comprises steps: forming a partial space connecting to a pressure source at an interface between the molding and the inner mold; supplying a pressure medium such as a gas or a liquid from the pressure source into the interface via said space to form a desired space between the molding and the inner mold over its entire zone and to expand the inner cavity of the molding; and releasing the inner mold from the molding.

5 Claims, 8 Drawing Figures

FIG_2

PRIOR ART

FIG_4
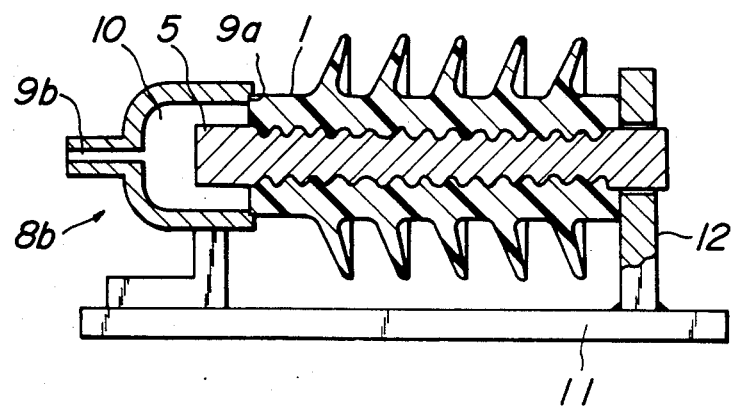
FIG_5
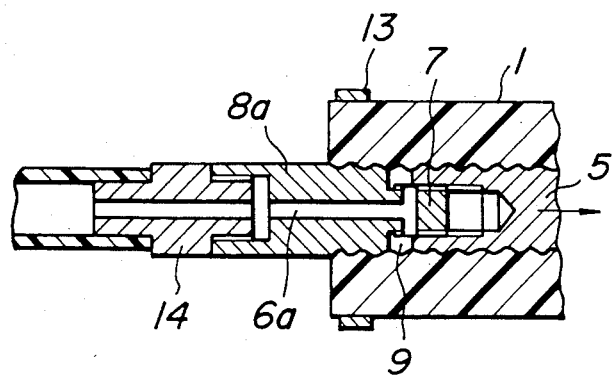

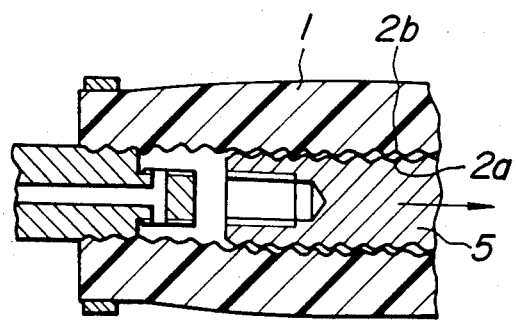
FIG._6
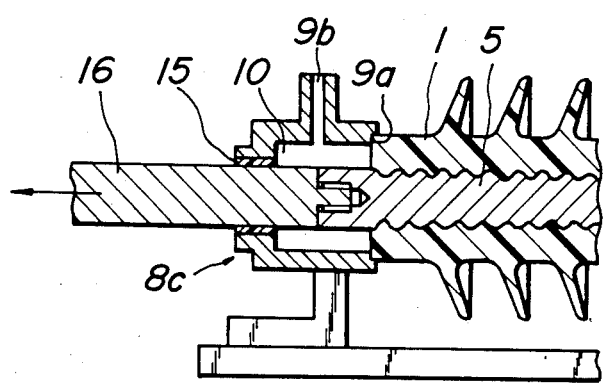
FIG._7
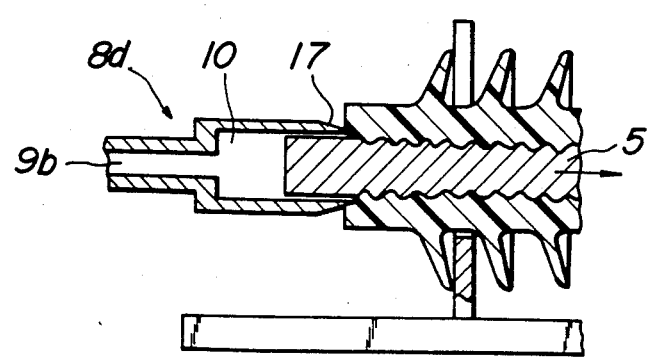
FIG._8

METHOD OF RELEASING AN INNER MOLD FROM A RUBBERY ELASTIC MOLDING

This is a continuation of application Ser. No. 579,505 filed Feb. 13, 1984, now abandoned.

BACKGROUND OF THE INVENTION

(1) Field of the Invention

This invention relates to a method of releasing an inner mold from a rubbery molding having a plurality of corrugations in its inner longitudinal cavity, and more specifically, to a method of releasing a long integral sheath made of a rubbery elastic insulating material forming a synthetic resin electrical insulator.

(2) Description of the Prior Art

Recently, there has been practically used a synthetic resin electrical insulator disclosed in, for instance, Japanese Patent Application Laid Open No. 73,821/1981 in which a whole surface of a fiber reinforced plastic rod (FRP) excluding metal fitting members attached to the rod at both ends thereof is covered with sheath made of a rubbery elastic insulating material such as silicone rubber, ethylene propylene rubber or the like. Such a synthetic resin electrical insulator has the merits that it is light in weight and has a high mechanical strength. It also can be adapted for various uses by appropriately selecting a material or a shape of the sheath.

In particular, an electrical insulator using a long integral sheath 1 having the corrugation 2 in its inner longitudinal cavity as shown in FIG. 1 has been used recently because its electric insulation performance at the interface between an FRP rod 3 and a sheath 1 is excellent.

Heretofore, when the sheath formed from a rubbery elastic insulating material and having corrugations in the inner longitudinal cavity, as mentioned above, is shaped, a separable outer mold having the corresponding inner surface configuration to the contour of the sheath and an inner mold (mandrel) forming the undulated corrugation in the inner longitudinal cavity of the sheath are employed. A rubbery elastic insulating material such as silicone rubber or ethylene propylene rubber is injected into the space between the outer mold and the mandrel. In the case where the mandrel is released from a molding (shaft) obtained by curing the elastic insulating material between the outer mold and the mandrel, it is conventional to open the outer mold first into two halves, as shown in FIG. 2, and one end of the sheath 1 is fixed onto a support base 4. The mandrel 5 is then pushed out from the molding in the direction of the arrow by means of a releasing device 8.

According to the above releasing method, it is possible to push out the mandrel when the sheath is as relatively short, such as 20–30 cm, but the corrugation portion, more specifically, the projecting ribs of the mandrel are firmly engaged with the molding. Thus, when the mandrel is pushed out from the molding, an excessive force is inevitably applied onto the corrugated portion of the inner surface of the sheath and the corrugated portion is likely to be damaged. Furthermore, the end surface is compressed abnormally and an internal defect is also likely to result. These phenomena are pronounced when a sheath as long as several meters is produced. In summary, it has been almost impossible using conventional methods to release a mandrel from a long molding having a corrugation in its inner longitudinal surface without causing damage to the corrugated portion.

SUMMARY OF THE INVENTION

It is, therefore, an object of the present invention to eliminate the above problems encountered by the prior art and to provide a method of reliably releasing a mandrel from a long integral molding composed of a rubbery elastic material having a corrugated portion along its inner longitudinal cavity, without causing any damage to the corrugated portion.

The present invention lies in a method of releasing an inner mold from a rubbery elastic molding in which a rubbery elastic material is cure-molded between an inner mold (mandrel) having a corrugated outer surface and an outer mold for a sheath. The inner mold is then released from the cured molding, said release comprising forming a partial space between the molding and the inner mold and flowing thereinto a pressurized medium such as a gas or a liquid, thereby resulting in expansion of the inner longitudinal cavity of the molding in a radial direction. Thus, a desired space results over substantially the entire zone between the molding and the inner mold, whereby the inner mold is released from the molding.

These and further objects, features and advantages of the invention are disclosed in the following description of the invention, which is to be read in conjunction with the accompanying drawings, with the understanding that some modifications, variations and changes of the invention will be easily made by an artisan skilled in the art to which the invention pertains, without departing from the spirit of the invention and the scope of the claims appended hereto.

BRIEF DESCRIPTION OF THE DRAWINGS

FIG. 4 is a sectional view of another embodiment used in performing the method of the invention;

FIG. 5 is a schematic view illustrating the method of the invention by way of the releasing apparatus shown in FIG. 2;

FIG. 6 is a schematic view illustrating the releasing mechanism when the releasing is carried out by the apparatus of FIG. 2; and FIGS. 7 and 8 are schematic sectional views illustrating additional embodiments used in the releasing method according to the invention.

DESCRIPTION OF THE PREFERRED EMBODIMENTS

Figure 1:
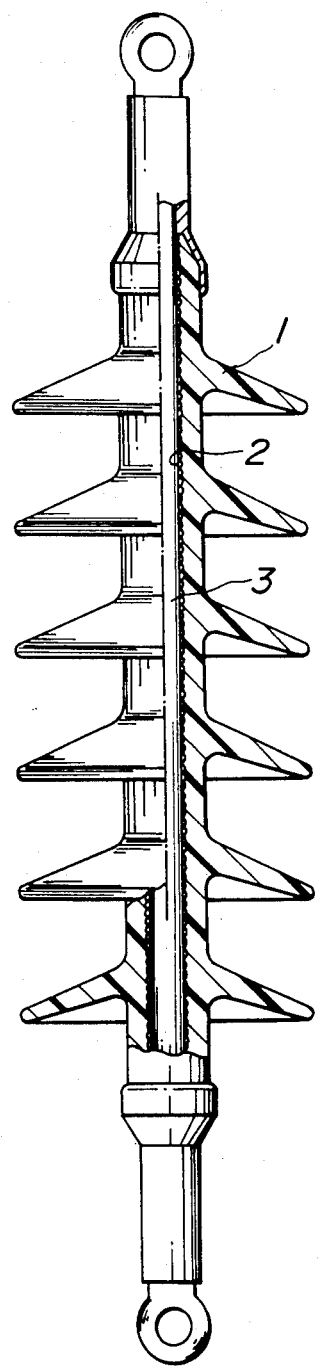
FIG. 1 is a partially broken sectional view illustrating the construction of a synthetic resin electrical insulator.
Figure 2:
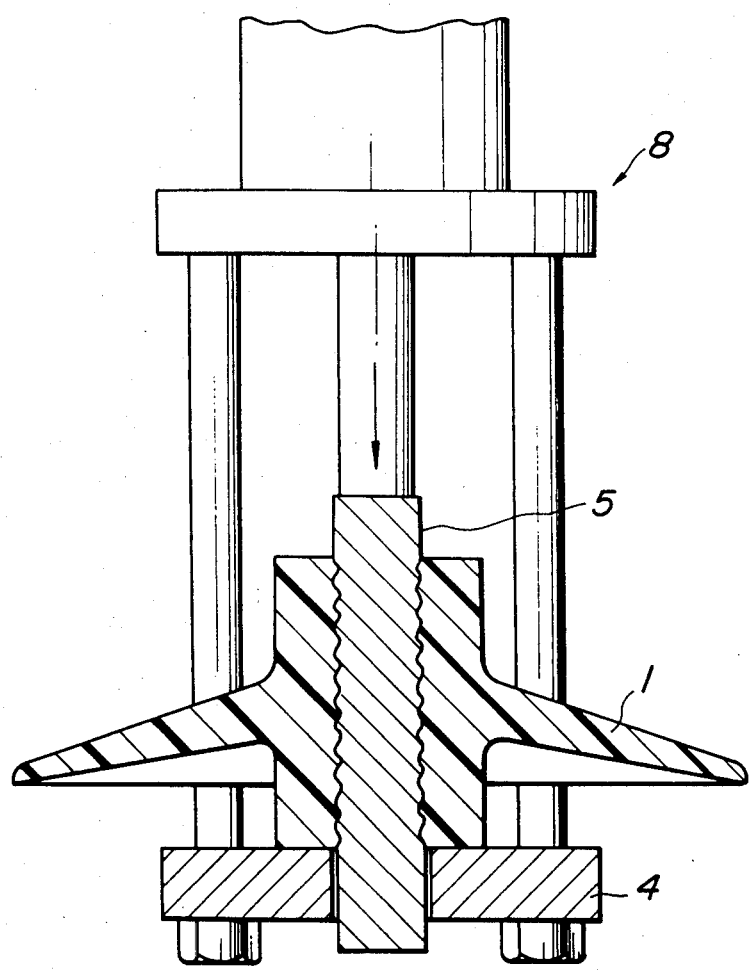
FIG. 2 is a partially broken sectional schematic view illustrating the conventional releasing method.
Figure 3:
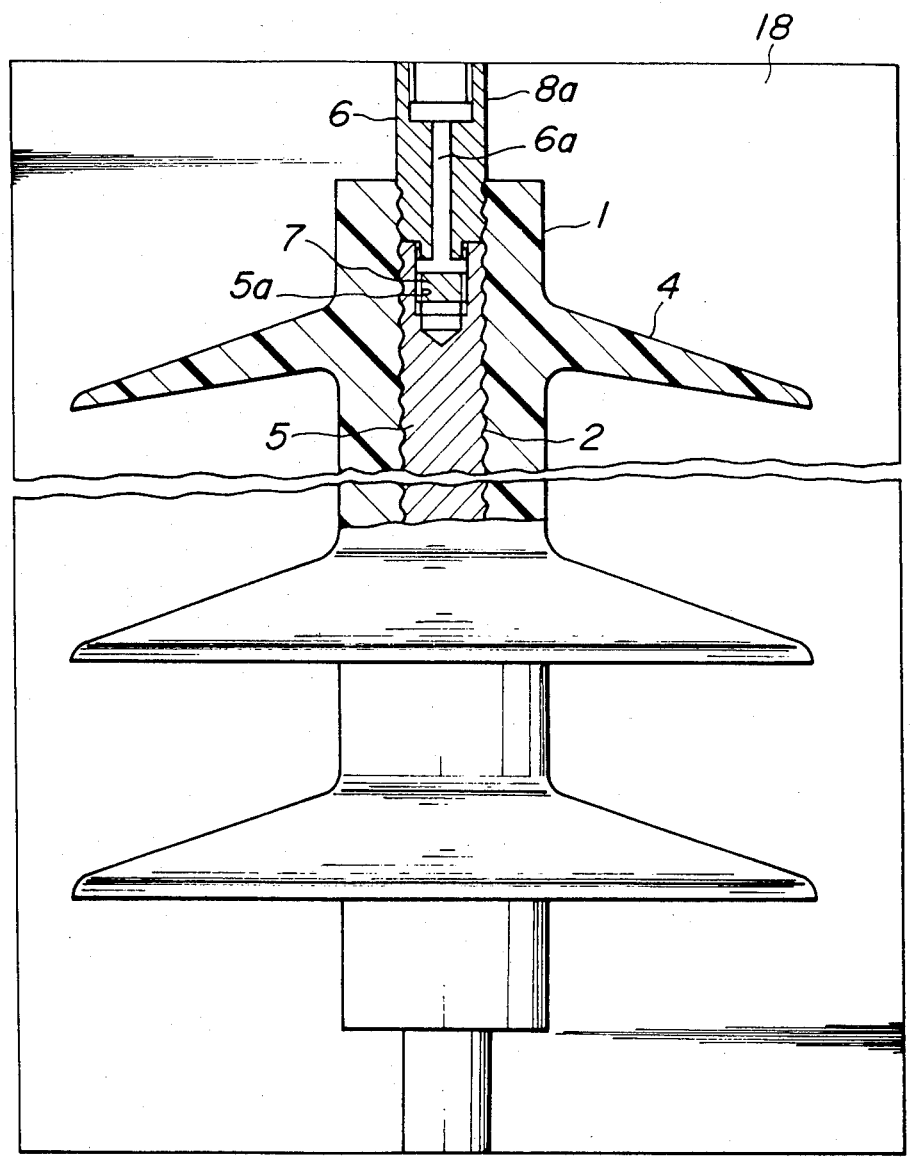
FIG. 3 is a partial sectional view illustrating the location where an apparatus for releasing the mandrel used in the present invention is fitted.

The invention will be described with reference to the accompanying drawings as follows:

FIG. 3 shows one embodiment of the mold-releasing device of the present invention, where said device contacts the mandrel in the molded sheath.

Although as an example of a molding is taken up a seamless integral sheath 1 made of an elastic insulating material and provided with a plurality of corrugations 2 in its inner longitudinal cavity and a plurality of overhangs in its outer portions, the invention is not limited thereto. If the molding is a rubbery elastic material having an uneven inner surface, the present invention can be applied thereto.

According to the invention, in the above mentioned prior shaping mold, there is provided separately a device for releasing the mandrel from the molding in which a passage for supplying a pressurized medium, such as air or other gases or liquids such as water, oil, grease or the like into the interface between a mandrel having a corrugated outer surface and the molding (sheath). The pressurized medium is supplied from the passage to expand the molding in the radial direction, and thereby removing the mandrel from the molding.

The mold-releasing device 8a, shown in FIG. 3, comprises a cylindrical short body 6 made of metal, synthetic resin, or the like, in which the top end has the same outer shape as that of the mandrel 5. A passage 6a is further provided for supplying a pressurized medium such as gas or air to the interface between the molding and the mandrel. Also, an insertion portion 7 threadedly engages the mandrel 5 and projects from the top of the short cylindrical body 6 so as to connect with the passage 6a.

When the sheath is shaped, the mold-releasing device 8a and the mandrel 5 are fixed together by screwing the insertion portion 7 to the fitting screw hole 5a of the mandrel 5 so as not to permit any space between the cylindrical short body 6 and the mandrel 5.

As another embodiment of the mold-releasing device, as shown in FIG. 4, a cup-shaped high pressure chamber 10, made of a metal or a plastic and provided with a sealing face 9a, which supports one end surface of the sheath 1 and seals said chamber, and with a passage 9b, through which high pressure air is introduced, may be provided. In such a case, it is not necessary to join directly the mold-releasing device 8a to the top end of the mandrel 5 as in the above described embodiment, so that no seam is formed at the junction on the inner cavity of the sheath 1. This embodiment is preferable.

In the mold-releasing device 8b of FIG. 4, one end of the sheath 1 is air-tightly connected to the sealing face 9a of the cup-shaped high pressure chamber 10, fixed to the base support 11. Another end of the sheath 1 is fixed by means of a holding member 12 secured to the base support 11, so that the sheath is compressed between the sealing face 9a and the holding member 12.

The method of releasing the inner mold from the molding according to the invention will be explained by way of example with reference to the mold-releasing device shown in FIGS. 3, 5 and 6.

As shown in detail in FIG. 5, after one upper separable outer mold is taken away from a pair of outer molds in a conventional manner, a given space 9 is formed between the mandrel 5 and the mold-releasing device 8a, by loosening the screw joint portion between the inserted portion 7 of the mold-releasing device 8a and the mandrel 5. Next, one end of the sheath 1 is fixed tightly to the mold-releasing device 8a by means of a clamping member 13 such as a hose a band or the like. A high pressure air is then charged into the space portion 9., for example 3–5 kg/cm².G, preferably 3.5–4 kg/cm².G, through a charge member 14 from an appropriate pressure device (not shown) such as air compressor or the like which is connected to the passage 6a for supplying the pressurized air into the mold-releasing device. By further increasing the pressure of air charged into the space 9, the pressurized air enters the interface berween the sheath 1 and the mandrel 5 from the space portion 9. Consequently, the sheath 1 is expanded outwardly in a radial direction and a given space is formed over the entire longitudinal length of the interface between the mandrel 5 and the sheath 1. Then, the mandrel 5 is removed from the sheath 1 while the former is successively pulled out in the direction of the arrow while the sheath 1 is radially expanded. In this case, when the mandrel 5 is moved in the direction of the arrow, the corrugation 2b in the inner cavity of the sheath 1 is brought into contact with the corrugation 2a of the mandrel 5 as shown in FIG. 6, and the pressurized air is sealed therein. Due to this sealing, the sheath 1 is further expanded in the radial direction by the pressurized air to form a wider space between the sheath and the mandrel. In this manner, the inner diameter of the sheath 1 is fully enlarged by the high pressure air. Thus, the mandrel 5 can be removed from the sheath 1 with ease and accuracy irrespective of the length of the sheath and without damaging the sheath.

Next, the method of releasing the inner mold from the sheath according to the invention by using the mold-releasing device 8b equipped with the cup-shaped high pressure chamber made of metal or plastic, as shown in FIG. 4, will be explained.

After the separable outer mold is taken away, as shown in FIG. 4, spaces are formed between the sheath 1 and the mandrel 5 at both the end portions of the sheath 1 by fitting compressively the sheath 1 between the sealing face 9a of the releasing device 8b and the securing member 12. Thereafter, high pressure air is fed from the passage 9b to expand radially the sheath in the same manner as in the above described other embodiments, whereby the mandrel 5 is removed from the molding.

As the other embodiment of the mold-releasing device 8b in FIG. 4, use may be made of a mold-releasing device 8c of a cup-shaped high pressure chamber 10 having a sealing portion 15 which seals said chamber by inserting the mandrel through the sealing portion, as shown in FIG. 7. In this embodiment, the portion of the mandrel 5 extending from the sheath 1 has such a length that said portion can extend through the sealing portion 15 or an auxiliary member 16 can be attached to the mandrel so that said auxiliary member extends through the sealing portion 15.

The method of releasing the inner mold from the molding by using the device 8c as shown in FIG. 7 is as follows. After the mold-releasing device 8c is set at one end of the sheath 1, the peripheral edge of the sheath is pushed onto the sealing face 9a of the mold-releasing device by pulling the mandrel 5 toward the direction of the arrow, as shown in FIG. 7. Thus, a space is formed between the sheath 1 and the mandrel 5 at the end of the sheath 1. Then, pressurized air is fed from the passage 9b to expand radially the sheath 1 in a similar manner as in the above described other embodiment. Hence, the mandrel 5 is released from the sheath. In this example, the mandrel is moved in the opposite direction to that in the other examples in the releasing operation. It is preferable that the axial length of the sealing portion 15 in which the sealing is attained by air-tightly passing the mandrel therethrough, is larger than the pitch of the corrugation of the mandrel, because the pressure loss due to leakage of the high pressure air is prevented.

In order to form a space through which the high pressure air is forced between the molding and the inner mold and which is communicated with the high pressure chamber, the mold-releasing device 8b, may be provided with an annular wedge member, as shown in FIG. 8. This mold-releasing device 8d has an annular wedge portion 17 at its top portion of the high pressure chamber 10, in which the inner diameter is slightly larger than the outer diameter of the inner mold. The high pressure air introduced from a passage 9b passes through between the annular wedge portion and the inner mold and enters the space defined between the molding and the inner mold to expand radially the inner surface of the molding. Thus, the inner mold can be removed from the molding in the direction of the arrow.

In the above, explanation is made on the case where the high pressure air is used as a pressure medium by which the sheath is radially expanded, but the present invention can be carried out by using other pressurized mediums such as gas, oil or greasy substances. Particularly, if an oil or a greasy substance is used, it is not only facilitated to effect the releasing operation due to their lubricating action but also such a substance may be used together with a filler which is to be charged into the interior of the sheath when the electric insulator is assembled. Thereby, the step for charging such a filler can be omitted.

As described in the above embodiments, since the inner mold can be easily pulled out, said mold can be released from the sheath in the direction of the arrow but the release can also be accomplished by appropriately employing a hydraulic power adapted to be displaced in an axial direction.

As mentioned above, in the method of releasing the inner mold from the molding according to the invention, the mandrel is taken away from the molding by expanding the sheath in a radial direction by using pressurized air fed from the mold-releasing device as a pressure source. Therefore, the invention can carry out the releasing of the inner mold from the long integral molding having a plurality of corrugations in the inner cavity and thereby contributes to the industry.

What is claimed is:

1. A method of releasing an inner mold from a rubbery elastic molding for an insulator or an insulating tube in which a rubbery elastic material is cure-molded between the inner mold, having a corrugated outer surface, and an outer mold for a sheath, wherein the inner mold is released from the cured molding, said method comprising the steps of disassembling the outer mold; attaching a mold-releasing means to said elastic molding, said mold-releasing means comprising a cup-shaped high pressure chamber and a holding member, said cup-shaped high pressure chamber contacting a first axial end of said rubbery elastic molding to form a sealing surface, and said holding member contacting an opposite axial end of said rubbery elastic molding; compressing the rubbery elastic molding longitudinally between the sealing surface and the holding member, thereby forming a partial space between the rubbery elastic molding and the inner mold at one of said first axial end and said opposite axial end of the rubbery elastic molding, communicating a pressurized medium source with said high pressure chamber and said partial space, thereby forcibly introducing said pressurized medium into an interface between the rubbery elastic molding and the inner mold through said partial space to expand an inner cavity of the rubbery elastic molding in a radial direction and form a space between the rubbery elastic molding and the inner mold over substantially an entire longitudinal area therebetween; whereby the inner mold is thereafter extracted axially from the rubbery elastic molding by mechanically sliding said inner mold relative to said rubbery elastic molding, while said inner cavity is radially expanded.

2. The method as claimed in claim 1, wherein said pressurized medium communicates with said partial space of the molding through a supply channel which is tightly connected thereto.

3. The method as claimed in claim 2, wherein said tight connection comprises a clamping means for clamping said supply channel and said partial space in the molding together.

4. The method as claimed in claim 1, wherein a rod is connected to an axial end portion of the inner mold, and the inner mold is extracted from the rubbery elastic molding by pulling the rod and inner mold relative to the molding.

5. The method as claimed in claim 4, wherein the rod sealingly protrudes through the cup-shaped high pressure chamber, and is connected to said axial end portion of the inner mold which is closest to said cup-shaped high pressure chamber.

* * * * *